US009114882B2

(12) United States Patent
Robertson, Jr. et al.

(10) Patent No.: US 9,114,882 B2
(45) Date of Patent: Aug. 25, 2015

(54) FAN CASE AND MOUNT RING SNAP FIT ASSEMBLY

(75) Inventors: Thomas J. Robertson, Jr., Glastonbury, CT (US); Mark W. Costa, Storrs, CT (US); Darin S. Lussier, Berlin, CT (US)

(73) Assignee: United Technologies Corporation, Hartford, CT (US)

( * ) Notice: Subject to any disclaimer, the term of this patent is extended or adjusted under 35 U.S.C. 154(b) by 1277 days.

(21) Appl. No.: 12/912,189

(22) Filed: Oct. 26, 2010

(65) Prior Publication Data

US 2012/0099975 A1  Apr. 26, 2012

(51) Int. Cl.
*F01D 25/24* (2006.01)
*B64D 27/26* (2006.01)
*F01D 21/04* (2006.01)
*F02C 7/04* (2006.01)

(52) U.S. Cl.
CPC .............. *B64D 27/26* (2013.01); *F01D 21/045* (2013.01); *F02C 7/04* (2013.01); *F05D 2300/603* (2013.01); *Y02T 50/44* (2013.01); *Y02T 50/672* (2013.01); *Y10T 29/49229* (2015.01)

(58) Field of Classification Search
CPC .................................................... F01D 21/045
USPC .............. 415/9, 142, 196, 197, 217.1; 244/54
See application file for complete search history.

(56) References Cited

U.S. PATENT DOCUMENTS

| 4,326,682 | A  | * | 4/1982 | Nightingale ..................... 244/54 |
| 4,940,386 | A  |   | 7/1990 | Feuvrier et al. |
| 6,394,746 | B1 |   | 5/2002 | Sathianathan et al. |
| 7,076,942 | B2 |   | 7/2006 | Schreiber |
| 7,246,990 | B2 | * | 7/2007 | Xie et al. .......................... 415/9 |
| 7,329,097 | B2 | * | 2/2008 | Kirk ........................... 415/213.1 |
| 7,370,467 | B2 |   | 5/2008 | Eleftheriou et al. |
| 8,021,102 | B2 | * | 9/2011 | Xie et al. ........................... 415/9 |
| 8,172,527 | B2 | * | 5/2012 | Duchatelle et al. ........ 415/213.1 |
| 8,197,191 | B2 | * | 6/2012 | Binks et al. .................... 415/119 |
| 2006/0059889 | A1 |   | 3/2006 | Cardarella, Jr. |
| 2008/0199301 | A1 |   | 8/2008 | Cardarella, Jr. |
| 2008/0232951 | A1 |   | 9/2008 | Cardarella |
| 2011/0154801 | A1 | * | 6/2011 | Mahan ....................... 60/39.091 |

OTHER PUBLICATIONS

Extended European Search Report for EP Application No. 11186657.0 dated Mar. 10, 2015.

* cited by examiner

*Primary Examiner* — Nathaniel Wiehe
*Assistant Examiner* — Woody A Lee, Jr.
(74) *Attorney, Agent, or Firm* — Carlson, Gaskey & Olds, P.C.

(57) ABSTRACT

A disclosed fan containment case includes a mount ring that supports a portion of the engine core. The mount ring includes openings and features that define a mounting location for the gas turbine engine. The example fan containment case includes a generally cylindrically shaped fan case that extends between an open front end and an open rear end. The mount ring is secured onto an outer surface of the fan case and includes a mounting lug and a plurality of openings for attachment of gas turbine engine components.

18 Claims, 4 Drawing Sheets

FAN CASE AND MOUNT RING SNAP FIT ASSEMBLY

BACKGROUND

This disclosure pertains to a composite fan containment case for a gas turbine engine. Specifically, this disclosure relates to a composite fan containment case including a mount ring that at least partially supports the containment case and the gas turbine engine.

A gas turbine engine can include a fan section containing fan blades surrounded by a fan case supported within a nacelle. The function of the fan case is to contain fractured and separated parts of the fan blades, preventing any portions from leaving the fan nacelle. Metallic fan cases can be undesirably heavy to perform this containment function. A composite fan case constructed of non-metallic materials can reduce weight and provide the same containment capability as a metallic fan case.

SUMMARY

An example disclosed fan containment case includes a mount ring that supports a portion of the engine core. The example mount ring includes lugs and other features that define mounting locations for the gas turbine engine.

The example fan containment case includes a generally cylindrically shaped fan case that extends between an open front end and an open rear end. The mount ring is secured onto an outer surface of the fan case. The mount ring includes one or more mounting flanges and a plurality of openings for attachment of gas turbine engine components. The example mount ring is attached to the containment case utilizing an interference fit. Once the mount ring is secured onto the outer case, fasteners extending through openings within the mount ring attach the fan case to guide vanes of the gas turbine engine. The combination of the interference fit along with the plurality of fasteners that extend through both the mount ring and the fan case provide adequate structure to support the engine.

These and other features disclosed herein can be best understood from the following specification and drawings, the following of which is a brief description.

DETAILED DESCRIPTION

Figure 1:
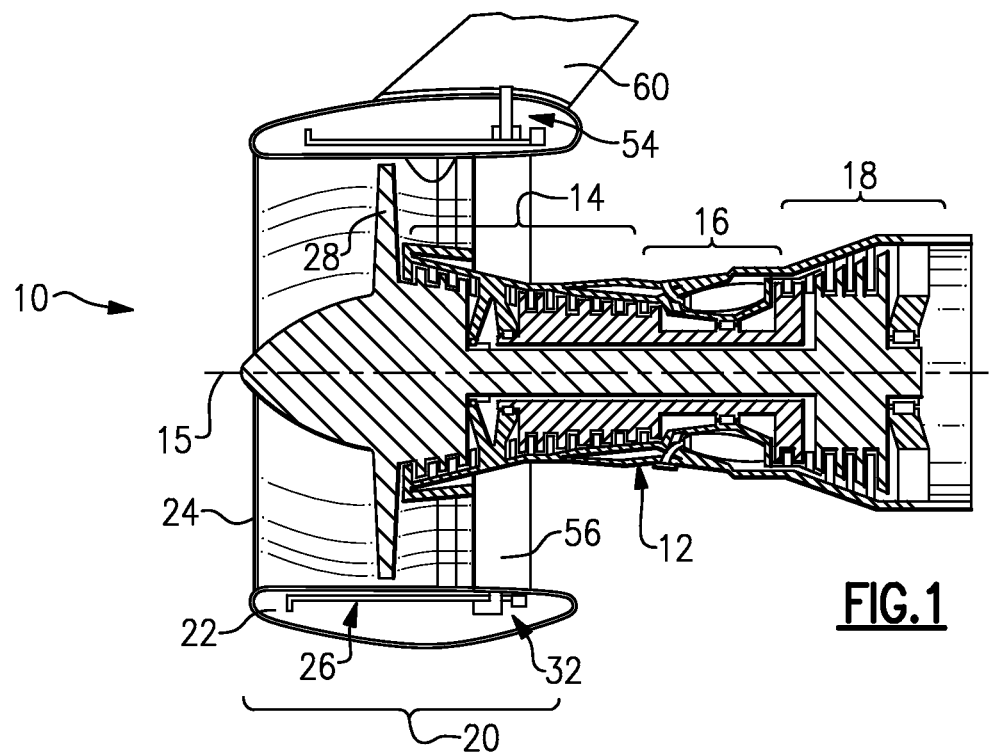
FIG. 1 is a schematic view of an example gas turbine engine.

Referring to FIG. 1, a gas turbine engine is schematically indicated at 10 and includes a core 12 having a compressor section 14, a combustion section 16 and a turbine section 18. The example gas turbine engine 10 includes a fan section 20 that is disposed within a nacelle 22 and includes a plurality of blades 28. The compressor, combustion, turbine, and fan sections 14, 16, 18 and 20 are arranged about an axis 15. The nacelle 22 defines an inlet 24 for incoming airflow. A fan containment case 26 is disposed proximate to the blades 28 within the fan section 20. The example containment case includes a mount ring 32 attached to a mount beam 54 attached to a frame member such as a pylon 60 of an aircraft. The mount ring 32 is also attached to at least one guide vane section 56 that extends from the engine core 12 to the containment case 26.

The example containment case 26 includes the mount ring 32 that supports a portion of the engine core 12. The guide vanes 56 that are disposed rearward of the fan section 20 are static relative to the rotating blades 28 and provide one of several mounting locations that support the engine core 12.

Figure 2:
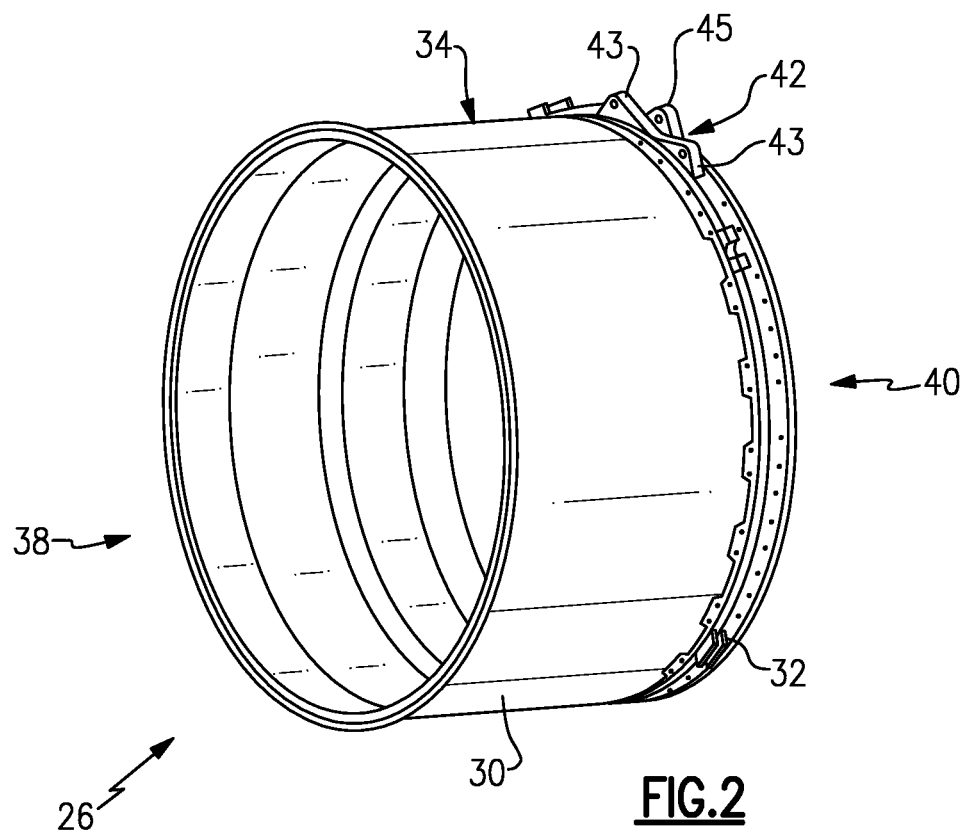
FIG. 2 is a perspective view of an example containment case.

Referring to FIG. 2, the example fan containment case assembly 26 includes a generally cylindrically shaped fan case 30 that extends between an open front end 38 and an open rear end 40. The mount ring 32 is secured onto an outer surface 34 of the aft end of the fan case 30 and overlaps a portion of the outer surface 34 of the composite containment case 30. The mount ring 32 includes one or more mounting flanges 42. The example mounting flange 42 extends radially outward from the mount ring 32 to provide a connection to the forward primary engine mount beam 54. The example mounting flange 42 includes a fail safe lug 45 that extends upward between primary lugs 43. The mounting flange 42 corresponds to a configuration of the engine mount beam 54 for securing the engine core 12 to the pylon 60 of the aircraft. As appreciated other mounting flange configurations could be utilized with contemplation of this disclosure.

Figure 3:
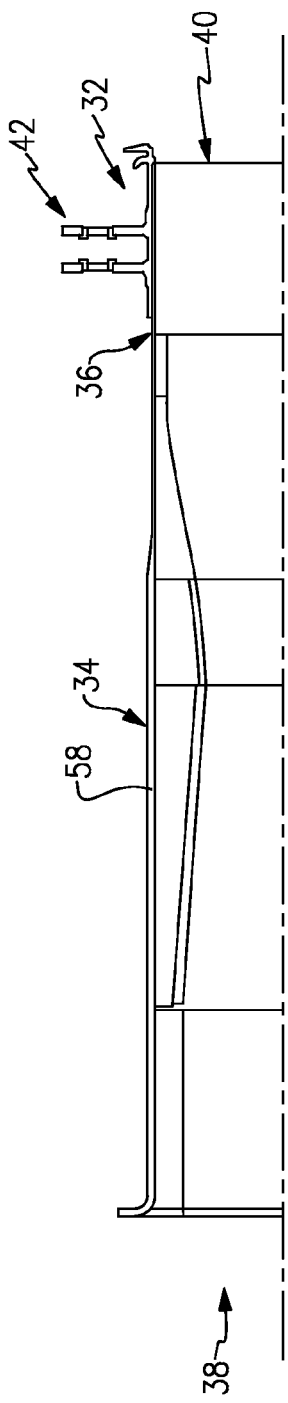
FIG. 3 is a cross sectional view of the example containment case.
Figure 4:
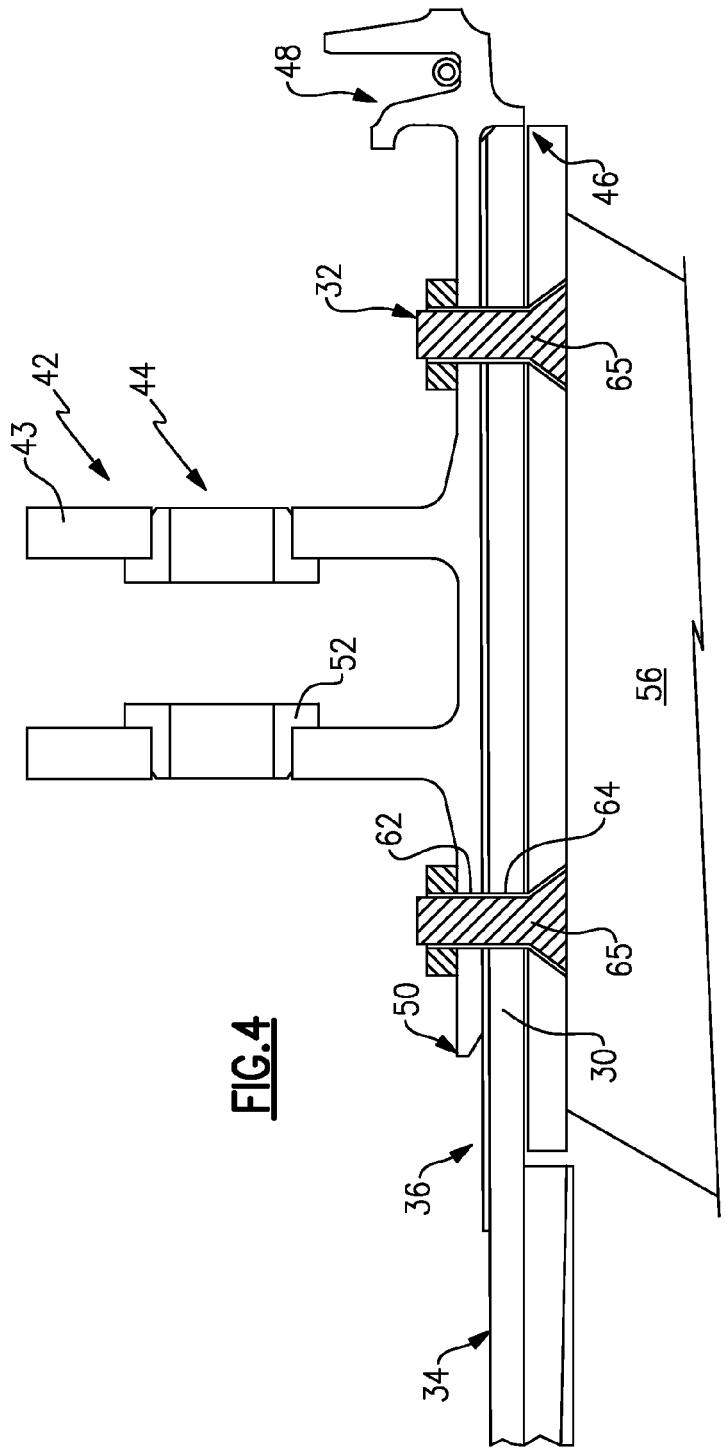
FIG. 4 is an enlarged cross section view of the example containment case and mount ring.

Referring to FIGS. 3 and 4 with continued reference to FIG. 2, the example fan case 30 is comprised of a plurality of composite layers 58. The plurality of composite layers 58 forms the generally cylindrical geometry of the case 30. The mount ring 32 fits over the outer surface 34 of the fan case 30 and is a forged ring of metal material. The disclosed example mount ring 32 is formed from titanium and fabricated through a forming process followed by secondary machining to form the various details and features of the disclosed mount ring 32.

The example mount ring 32 includes a lead in chamfer 50 that aids in guiding the mount ring 32 over the fan case 30 during assembly. The fan case 30 includes a sacrificial material 36 that is disposed along an axial length of the outer surface of the mount ring 32 that is at least as long as the mount ring 32. The sacrificial material 36 is machined prior to installation of the mount ring 32 to provide the desired interference fit between the mount ring 32 and the outer surface 34 of the fan case 30.

The mount ring 32 also includes an axial locating feature for installation. The example axial locating feature is a tab 46 that extends radially inward to abut the back end 40. The mount ring 32 is slid onto the fan case 30 to abut the tab 46. Abutment of the tab 46 against the back end 40 provides the desired location of the mount ring 32 onto the fan case 30. The axial locator 46 provides that the mount ring 32 is fit as desired to the containment case 30. In this example, the tab 46 is fit all about the circumference of the back end 40 that provides axial alignment between the mount ring 32 and the case 30. The tab 46 can be continuous about the circumference of the back end 40 or may be segmented. Moreover the tab 46 may vary in size and shape depending on axial locating requirements of the mount ring 32.

The mount ring 32 includes one or more mounting flanges 42 that extend radially upward and outward. One of two primary lugs 43 is shown in FIG. 4 and includes openings 44 that receive bushings 52. The bushings 52 are aligned to receive a fastener when secured to the engine mount beam 54. (Shown schematically in FIG. 1) The mount ring 32 also includes rearward extending portion with a radial groove 58 that is provided to engage components that interface with the containment case 30. The groove 48 provides a fit for a non-fastener attachment element that fits within the groove 48.

The example mount ring 32 is fit to the containment case 30 utilizing an interference fit. The interference fit is defined by the inner diameter of the mount ring 32 and the outer diameter of the fan case 30. In the disclosed example, the mount ring 32 is fit over the sacrificial material 36 that is layered on the outer surface 34 of the fan case 30. The sacrificial material 36 is machined to provide a final outer diameter dimension that corresponds with the inner diameter of the mount ring 32.

Once the mount ring 32 is fit onto the fan case 30, fasteners 65 extend through openings 62 within the mount ring 32 and openings 64 in the fan case 30 to attach the mount ring 32 and the fan case to the fan exit guide vanes 56 (FIG. 1) within the fan section 20. The combination of the interference fit along with the plurality of fasteners that extend through both the mount ring 32 and the fan case 30 secure the mount ring 32 in place on the case 30. Further, the mount ring 32 is secured to the engine core 12 by way of the guide vanes 56. The interference fit between the mount ring 32 and fan case 30 or additional fasteners maintain the relative position of the mount ring 32 and the fan case 30 until installation and mounting of the gas turbine engine 10 are complete.

Figure 5A:
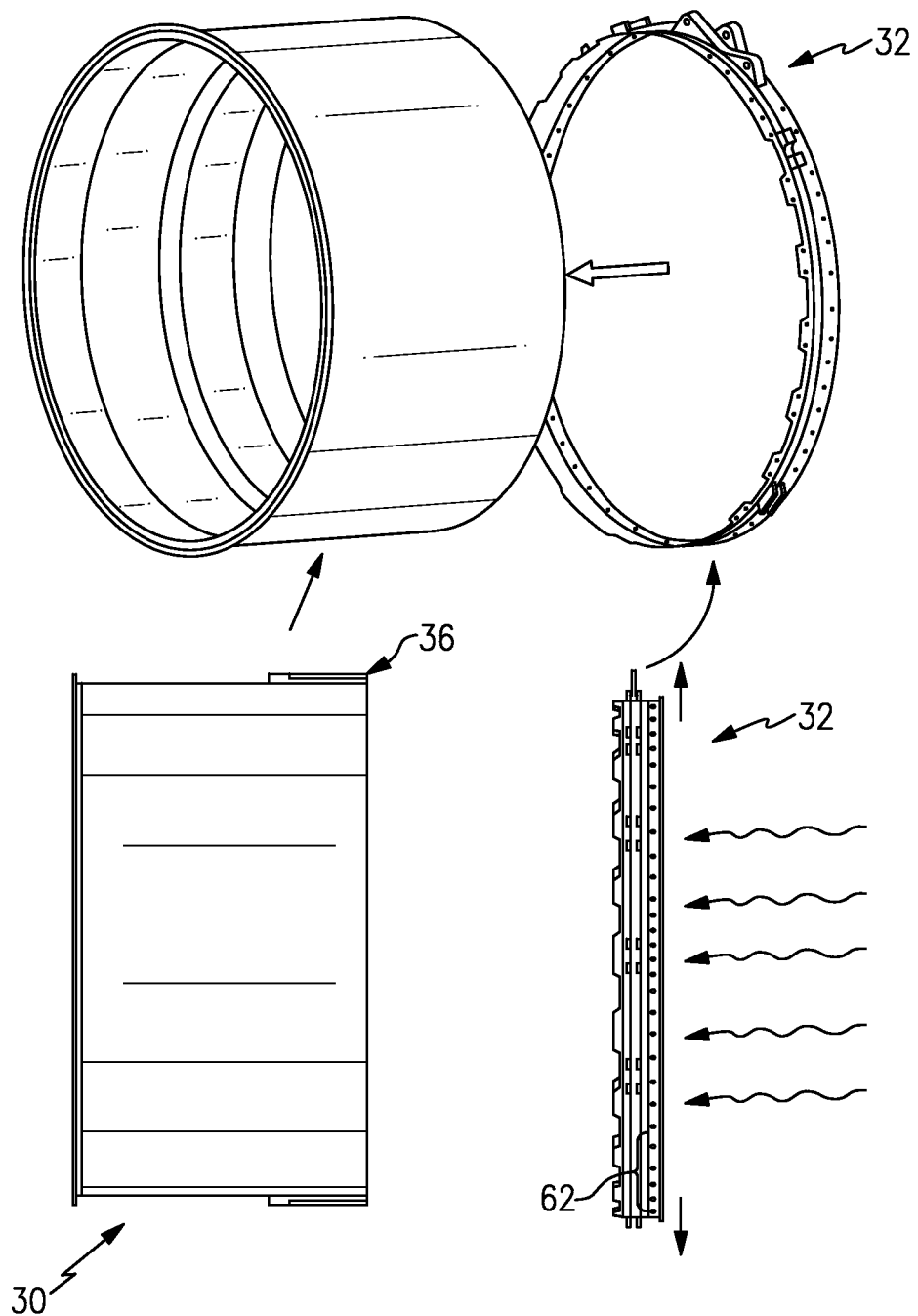
FIG. 5A is a schematic representation of a method of assembling the example containment case and mount ring assembly.
Figure 5B:
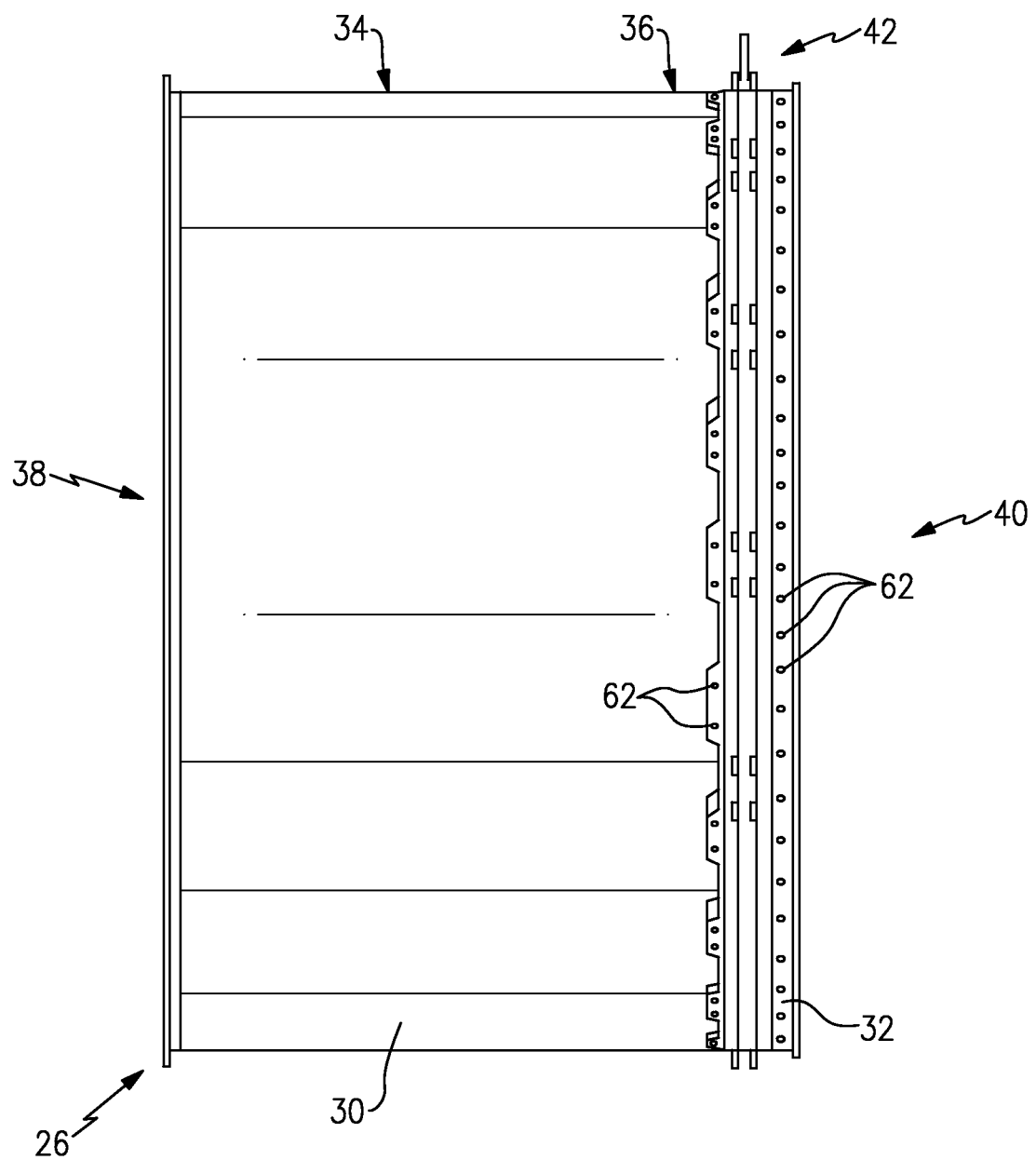
FIG. 5B is a side view of the example containment case with openings formed through the example mount ring and composite case.

Referring to FIGS. 5A and 5B with continuing reference to FIGS. 3 and 4 the example fan containment case 26 is fabricated by fitting the mount ring 32 onto the outer surface 34 of the fan case 30. The fan case 30 is formed from a plurality of composite materials to form the generally cylindrical case. An outer surface of the fan case 30 is covered with the sacrificial material 36. The example sacrificial material 36 is a plurality of fiberglass sheets that are machined to provide a desired surface finish. The thickness of the sacrificial material 36 is provided to define and correspond with a desired outer diameter of the fan case 30 that corresponds with the desired inner diameter of the mount ring 32 and the resulting interference fit.

The mount ring 32 is formed from a titanium material and is installed on to the fan case by heating to expand such that it will fit over the outer diameter of the fan case 30 and specifically onto the surface defined by the sacrificial material 36. Heating of the mount ring 32 expands it radially outward to increase the size of the inner diameter to allow the mount ring 32 to fit over the fan case 30. Once the mount ring 32 is inserted onto the fan case 30 it is allowed to cool and contract. After cooling and the resulting contraction of the mount ring 32, an interference fit is formed that provides load transfer from the mount ring 32 to the fan case 30.

The method steps for fabricating the example containment case 26 include forming the case 30 from a plurality of composite materials to form a generally cylindrical case having a front end 38 and a back end 40. The sacrificial material 36 is applied to the outer surface 34 at a thickness that provides sufficient desired machining allowances such that a desired outer diameter can be formed. The desired outer diameter of the sacrificial material 36 corresponds to a desired interference fit with the mount ring 32. The example sacrificial material 36 is fiberglass and can be applied according to known methods. Moreover, it should be understood that other machinable materials could be layered and applied to provide a machinable surface desired for the example sacrificial material 36. The sacrificial material 36 can be co-cured with the carbon material and layers utilized for defining the fan case 30 or added in a later processing step.

The example sacrificial material 36 is then machined using known methods to grind, cut or other remove material to obtain the desired outer diameter adjacent the back end of the fan case 30.

The method continues by forming the mount ring 32 from a titanium material. The forming step can be any step as is known in the art including forging, molding or other steps utilized and known to form shaped components from metal materials. Moreover, although a titanium material is disclosed by way of example, other metal materials, metal composites and alloys are also within the contemplation of this disclosure.

Once the mount ring 32 is initially formed, the specific features of the mount ring 32 are formed by secondary machining processes. These features include but are not limited to the tab 46 and the lead in chamber 50. Moreover, the example mount ring 32 includes openings provided for fasteners for the mounting of the guide vanes. Further, shaping and machining may be performed to define a desired inner diameter along with a rings, grooves, tabs or other features as may be desired to improve stability and strength.

Once the mount ring 32 is fully formed and ready for assembly to the composite case 30, the mount ring 32 is heated to a temperature that expands the mount ring 32 such that an inner diameter of the mount ring 32 grows to be capable of sliding over and onto the sacrificial material 36 at the back end 40 of the composite case 30.

The example mount ring 32 is provided with the lead in chamfer 50 to aid installation and provide an initial fit over the back side 40 of the containment case 30. Once the lead in 50 is over the end of the fan case 40 the remainder of the mount ring 32 is pressed onto the back end 40 of the fan case 30 until the tab 46 engages the back end 40.

Once this mount ring 32 has abutted the end of the fan case 40 the mount ring 32 is allowed to cool. Cooling of the mount ring 32 contracts the mount ring 32 around the case 30 to form an interference fit with the fan case 30 such that the mount ring 32 becomes a substantially integral part of the fan case 30.

Referring to FIG. 5B with continued reference to FIG. 5A and FIG. 4, once the mount ring 32 is secured to the fan case 30, openings 64 are formed through the mount ring 32 and into the fan case 30 using known machining techniques. In this example, the mount ring 32 includes a plurality of defined openings 62 that are formed prior to attachment to the fan case 30. The fan case 30 is not provided with any openings so that alignment of openings is not a factor during the mounting process of the mount ring 32. This eliminates the need for circumferential alignment of the fan case 30 with the mount ring 32 during attachment of the mount ring 32. The openings 62 defined in the mount ring 32 are utilized to subsequently form corresponding openings 64 (FIG. 4) through the fan case 30. Accordingly, because the openings 62, 64 that are utilized for attaching the mount ring 32 to the various guide vanes 56 of the engine core 12 are formed once the mount ring 32 is mounted to the fan case 30 there is no need to provide a clocking feature to circumferentially align the mount ring 32 onto the fan case 30. It is within the contemplation of this disclosure that an alignment feature such as a pin and slot could be utilized to set a desired relative circumferential position between the mount ring 32 and the fan case 30.

Accordingly, the example containment case provides for the formation of a fan containment case 26 with an integral mount ring 32 that provides the connection between the engine core 12 and the engine mount 54.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A fan containment case comprising:
    a plurality of composite layers defining a generally cylindrical case including an outer surface and a back end, wherein the plurality of composite layers define an axial length for surrounding a plurality of fan blades; and
    a mount ring secured to the outer surface of the cylindrical case at the back end, the mount ring being comprised of a metal, wherein the mount ring includes an axial locating feature abutting the back end of the cylindrical case for locating the mount ring relative to the cylindrical case and the mount ring includes a lead-in chamfer for guiding the mount ring onto the back end of the cylindrical case.

2. The fan containment case as recited in claim 1, wherein the mount ring includes one or more radially extending lugs for securing the fan containment case to an engine mount.

3. The fan containment case as recited in claim 1, wherein the mount ring includes a plurality of radially extending openings for securing the generally cylindrical case to a guide vane.

4. The fan containment case as recited in claim 1, wherein the mount ring comprises an inner diameter that fits over the outer surface of the cylindrical case in an interference fit.

5. The fan containment case as recited in claim 4, wherein the outer surface of the cylindrical case includes a machinable material onto which the mount ring is secured.

6. The fan containment case as recited in claim 1, wherein the mount ring includes an outer V-shaped groove for mating to additional structures of the fan containment case.

7. The fan containment case as recited in claim 1, wherein the back end of the cylindrical case comprises a terminal end of the cylindrical fan containment case.

8. A gas turbine engine fan section comprising:
    a plurality of composite layers defining a generally cylindrical fan containment case;
    a mount ring attached to a back end of the cylindrical fan containment case, wherein the mount ring includes an axial locating feature abutting the back end of the cylindrical fan containment case for locating the mount ring relative to the cylindrical fan containment case and the mount ring includes a lead-in chamfer for guiding the mount ring onto the back end of the cylindrical case;
    a plurality of fan blades disposed within the generally cylindrical fan containment case, wherein the fan containment case is defines an axial space that that surrounds the plurality of fan blades; and
    a guide vane attached to the mount ring.

9. The gas turbine engine fan section as recited in claim 8, wherein the mount ring includes a radially extending lug for securement to an engine mount.

10. The gas turbine engine fan section as recited in claim 8, wherein the mount ring includes an outer V-shaped groove.

11. The gas turbine engine fan section as recited in claim 8, wherein the cylindrical fan containment case includes a machinable material on an outer surface onto which the mounting ring is attached.

12. The gas turbine engine fan section as recited in claim 8, including a plurality of openings through the mount ring and the cylindrical fan containment case through which fasteners extend for securing the mount ring to the guide vane.

13. The gas turbine engine as recited in claim 8, wherein the mount ring is disposed axially aft of the plurality of fan blades.

14. A method of manufacturing a fan containment case comprising:
    forming a generally cylindrical fan containment case with a plurality of composite layers, wherein the cylindrical fan containment case defines an axial length within which a plurality of fan blades rotate;
    forming a mount ring from a metal material;
    expanding the mount ring by heating;
    sliding the mount ring over a back end of the cylindrical fan containment case, and including forming the mount ring to include an axial locating feature and abutting the axial locating feature against the back end of the cylindrical fan containment case when sliding the mount ring onto the cylindrical fan containment case for locating the mount ring relative to the cylindrical fan containment case and including forming the mount ring to include a lead-in chamfer for guiding the mount ring onto the back end of the cylindrical case; and
    retracting the mount ring by cooling to form an interference fit between an inner surface of the mount ring and an outer surface of the cylindrical fan containment case.

15. The method as recited in claim 14, including the step of providing a sacrificial material on an outer surface of the cylindrical fan containment case and machining the sacrificial material in view of an inner diameter of the mount ring to define the interference fit.

16. The method as recited in claim 14, including forming a radially extending lug on the mount ring.

17. The method as recited in claim 14, including forming an outer V-shaped groove on the mount ring.

18. The method as recited in claim 14, including forming opening through the mounting ring and the cylindrical fan containment case for fasteners.

* * * * *

UNITED STATES PATENT AND TRADEMARK OFFICE
CERTIFICATE OF CORRECTION

PATENT NO. : 9,114,882 B2
APPLICATION NO. : 12/912189
DATED : August 25, 2015
INVENTOR(S) : Thomas J. Robertson It is certified that error appears in the above-identified patent and that said Letters Patent is hereby corrected as shown below:

IN THE CLAIMS:

In claim 8, column 6, line 1; after "case" delete "is"

In claim 8, column 6, line 1; after "that" delete "that"

Signed and Sealed this
Ninth Day of February, 2016

Michelle K. Lee
*Director of the United States Patent and Trademark Office*